United States Patent
Jin et al.

(10) Patent No.: US 8,046,223 B2
(45) Date of Patent: Oct. 25, 2011

(54) APPARATUS AND METHOD OF VOICE RECOGNITION SYSTEM FOR AV SYSTEM

(75) Inventors: Min Ho Jin, Daejon (KR); Jong Keun Shin, Gyeongsangbuk-do (KR); Chang D. Yoo, Daejon (KR); Sang Gyun Kim, Daejon (KR); Jong Uk Kim, Daejon (KR)

(73) Assignee: LG Electronics Inc., Seoul (KR)

( * ) Notice: Subject to any disclaimer, the term of this patent is extended or adjusted under 35 U.S.C. 154(b) by 1486 days.

(21) Appl. No.: 10/883,775

(22) Filed: Jul. 6, 2004

(65) Prior Publication Data
US 2005/0033572 A1    Feb. 10, 2005

(30) Foreign Application Priority Data
Jul. 7, 2003 (KR) .................. 10-2003-0045765

(51) Int. Cl.
*G10L 15/04* (2006.01)
(52) U.S. Cl. ......... 704/253; 704/251; 704/252; 704/275
(58) Field of Classification Search .................. 704/275
See application file for complete search history.

(56) References Cited

U.S. PATENT DOCUMENTS

| | | | | |
|---|---|---|---|---|
| 5,500,673 A | * | 3/1996 | Zhou | 348/156 |
| 5,978,762 A | * | 11/1999 | Smyth et al. | 704/229 |
| 6,016,473 A | * | 1/2000 | Dolby | 704/500 |
| 6,292,778 B1 | * | 9/2001 | Sukkar | 704/256.4 |
| 6,968,064 B1 | * | 11/2005 | Ning | 381/66 |
| 7,006,974 B2 | * | 2/2006 | Burchard et al. | 704/275 |
| 7,058,185 B1 | * | 6/2006 | Egelmeers et al. | 381/93 |
| 2001/0018654 A1 | * | 8/2001 | Hon et al. | 704/257 |
| 2001/0039494 A1 | | 11/2001 | Burchard et al. | |
| 2002/0021799 A1 | | 2/2002 | Kaufholz | |
| 2002/0176585 A1 | * | 11/2002 | Egelmeers et al. | 381/71.11 |

FOREIGN PATENT DOCUMENTS

| | | |
|---|---|---|
| CN | 1388956 A | 1/2003 |
| CN | 200410063726 C | 10/2007 |
| EP | 1 246 165 A1 | 10/2002 |
| EP | 1 355 296 A2 | 10/2003 |
| KR | 1999-0030943 A | 5/1999 |
| KR | 10-2000-0032269 A | 6/2000 |
| WO | WO 02/07151 A2 | 1/2002 |
| WO | WO 02/15169 A1 | 2/2002 |
| WO | WO 02/075722 A1 | 9/2002 |

* cited by examiner

*Primary Examiner* — Leonard Saint Cyr
(74) *Attorney, Agent, or Firm* — Birch, Stewart, Kolasch & Birch, LLP

(57) ABSTRACT

To improve the accuracy of the voice recognition system for an AV system, the present invention includes a reflected sound remover having a plurality of filters, the reflected sound remover being configured to receive an input sound signal including a reflected AV system audio, a user's voice, and a noise, and being configured to remove the reflected audio from the input sound according to user's voice information; a voice detector detecting the user's voice from a signal outputted from the reflected sound remover and obtaining the user's voice information based on the detected user's voice; and a voice recognition unit comparing the detected user's voice with voice patterns that belong to at least one model.

24 Claims, 5 Drawing Sheets

APPARATUS AND METHOD OF VOICE RECOGNITION SYSTEM FOR AV SYSTEM

CROSS-REFERENCE TO RELATED APPLICATIONS

This application claims the benefit of Korean Application P2003-45765, filed on Jul. 7, 2003, which is hereby incorporated by reference.

BACKGROUND OF THE INVENTION

1. Field of the Invention

The present invention relates to perceiving a phonic input, and more particularly, to an apparatus and a method of perceiving a user's phonic input in AV system.

2. Discussion of the Related Art

In general, electronic home appliances such as TVs and audios are equipped with remote controllers that manipulate such home appliances. Yet, it has long been inconvenient that the remote controller must be near a user's reach. If the user loses the remote controller, the user has to manipulate the home appliances themselves. Furthermore, it is inconvenient for the disabled and the elder to even manipulate their home appliances by their remote controllers themselves. Due to this, the voice recognition system has been developed and applied to the many electronic home appliances.

The voice recognition system makes it possible that people communicate with machinery and computers by only people's phonic expressions. Even though the voice recognition system has been applied to many fields and brought much convenience to the people, it has not been successful in the AV (audio-visual) system. The fact that there are too many noises around as well as from the AV appliances and remote distance from the AV appliances to users makes the voice recognition system less reliable and accurate. Accordingly, there are many problems that need to be solved to implement the voice recognition system in the AV system.

SUMMARY OF THE INVENTION

Accordingly, the present invention is directed to an apparatus and a method of voice recognition system in AV system that substantially obviates one or more problems due to limitations and disadvantages of the related art.

An object of the present invention is to provide an apparatus and a method of voice recognition system under a situation where reflected sound and noises are present Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a voice recognition system for an audio-visual (AV) system comprises a reflected sound remover having a plurality of filters, the reflected sound remover being configured to receive an input sound signal including a reflected AV system audio, a user's voice, and a noise, and being configured to remove the reflected audio from the input sound according to user's voice information; a voice detector detecting the user's voice from a signal outputted from the reflected sound remover and obtaining the user's voice information based on the detected user's voice; and a voice recognition unit comparing the detected user's voice with voice patterns that belong to at least one model.

The reflected sound remover includes a first filter bank dividing the original AV system audio into a first plurality of signals having different frequency ranges; a second filter bank dividing the input sound into a second plurality of signals having the different frequency ranges; a plurality of adaptive filters removing the reflected AV system audio from the second plurality of signals using the first plurality of signals; and a third filter bank combining the signals outputted from the plurality of adaptive filters.

The reflected sound remover further includes at least one of a blocking frequency, a transmitting frequency, and a reflected sound removing rate of the filters, according to the detected property information of the user's voice. The voice recognition unit compares the first probability and the second probability with reference values, and recognizes the user's voice depending on an outcome of the comparing the first and the second probabilities with reference values.

The voice recognition unit calculates a plurality of probabilities that the user's voice matches the predetermined voice patterns in the first model, and selects a highest probability from the plurality of probabilities as the first probability. In addition, the voice recognition unit calculates a plurality of probabilities that the user's voice matches the voice patterns in the second model, and selects a highest probability from the plurality of probabilities as the second probability. The first model includes voice patterns which correspond to predetermined words and the second model accumulates voice patterns which do not correspond to the predetermined words.

In another aspect of the present invention, A method for recognizing a voice for an audio-visual (AV) system includes receiving an input signal including a reflected AV system audio, a user's voice, and a noise; removing the reflected AV system audio from the input signal according to user's voice information by passing the input signal through a plurality of filters; detecting the user's voice from the first signal and obtaining the user's voice information based on the detected user's voice; and comparing the detected user's voice with voice patterns that belong to at least one model.

The step of controlling the plurality of filters includes fixing parameters of the plurality of filters during an interval from a starting point to an ending point of the user's voice. The parameters include at least one of a blocking frequency, a transmitting frequency, and a reflected sound removing rate of the plurality of filters.

The step of comparing the detected user's voice with voice patterns from at least one model includes calculating a first probability that the user's voice matches the voice patterns in a first model, and calculating a second probability that the user's voice matches the voice patterns in a second model. It also includes determining the ratio of the first probability and the second probability and comparing the determined ratio with reference values, and recognizing the user's voice depending on the ratio of the first probability and the second probability.

In another aspect of the present invention, a voice recognition system for an audio-visual (AV) system includes a voice detector detecting a user's voice from a received sound; and a voice recognition unit calculating a first probability that the user's voice matches one of voice patterns in a first model and a second probability that the user's voice matches one of voice patterns in a second model, and recognizing the user's voice according to a ratio of the first probability and the second probability.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
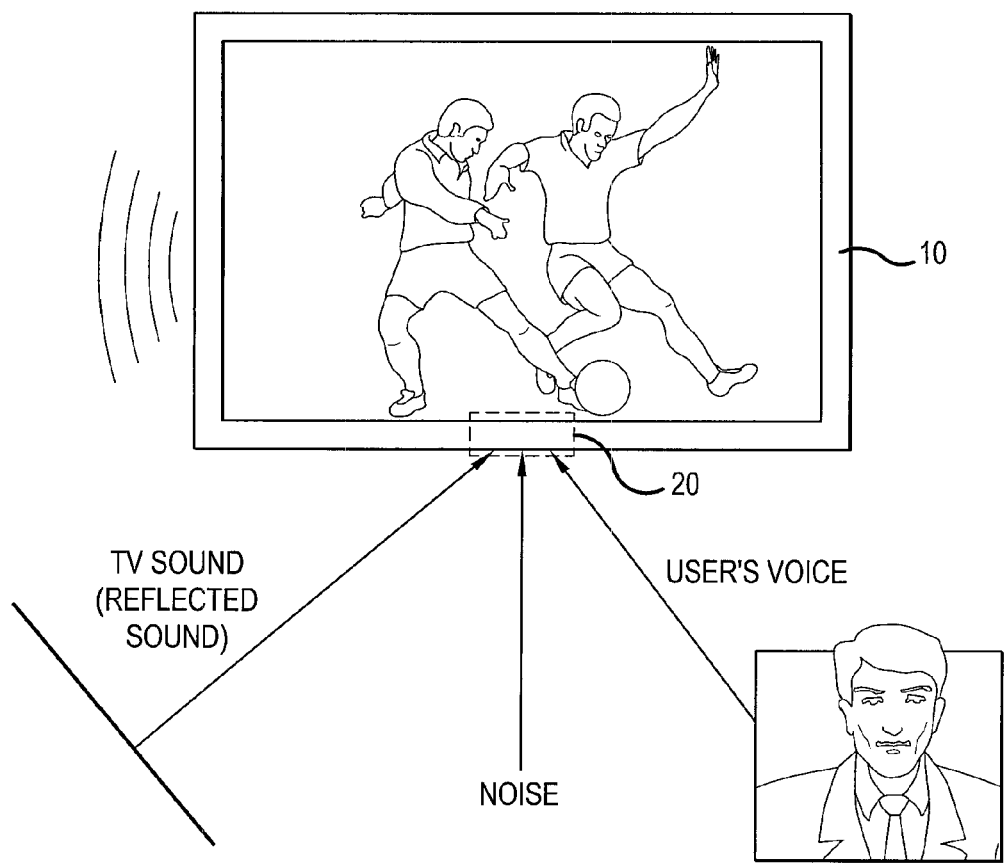
FIG. 1 is an example of a TV including a voice recognition system in accordance with the present invention.

FIG. 1 illustrates an example of an audio-visual (AV) system including a voice recognition system according to the present invention. Referring to FIG. 1, the TV 10 includes the voice recognition device 20, which receives reflected sound, noises and a user's voice. The reflected sound is TV 10 sound that is reflected by walls or remote objects. The best mode to place the voice recognition device 20 is on the front side of the TV 10.

Figure 2:
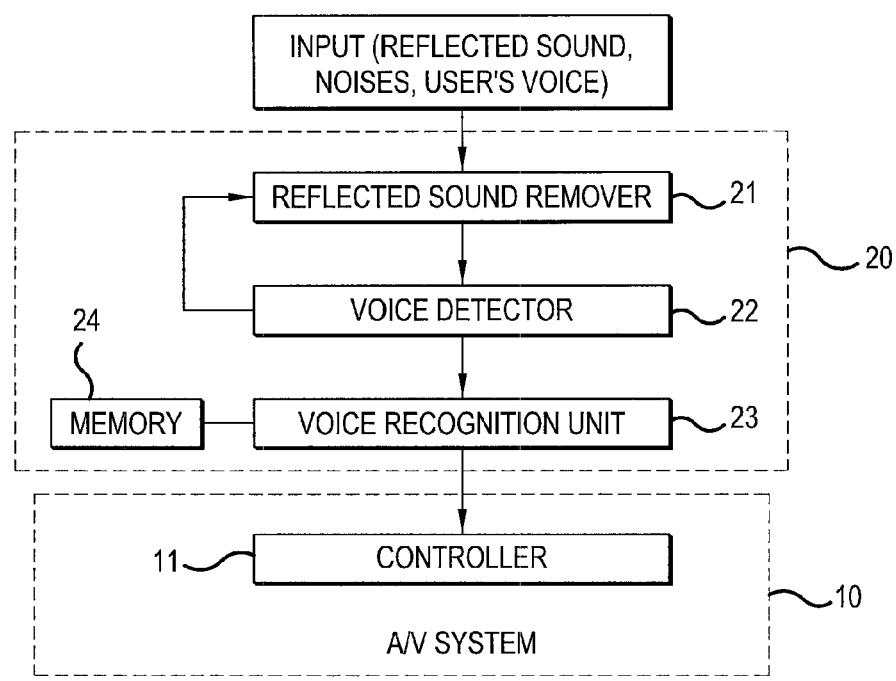
FIG. 2 is a block diagram illustrating the voice recognition system in AV system in accordance with the present invention.
Figure 3:
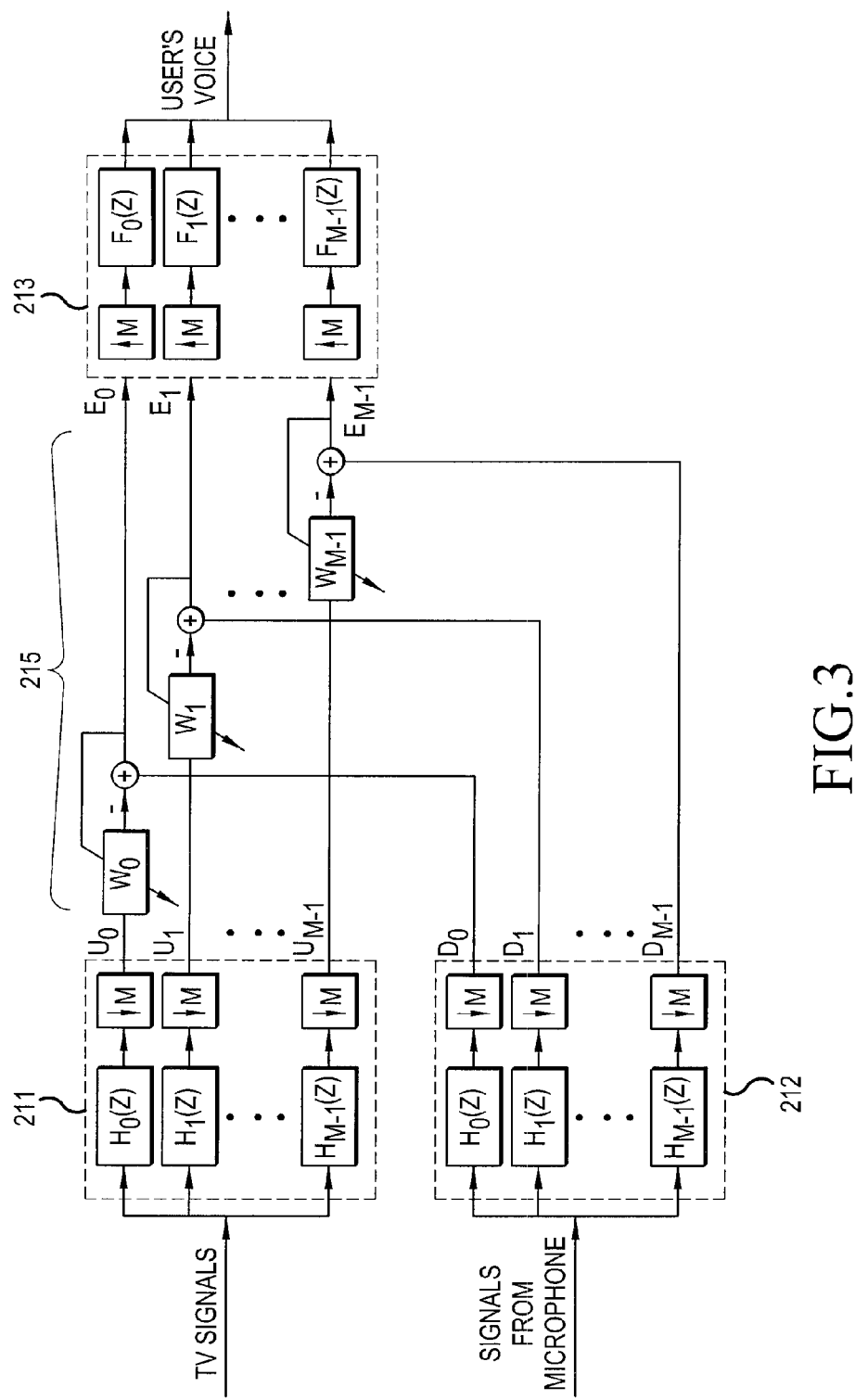
FIG. 3 is a detailed diagram illustrating a reflected sound remover in accordance with the present invention.

FIG. 2 is a block diagram illustrating the voice recognition system 20 in AV system according to the present invention. Referring to FIG. 2, the TV 10 includes a microphone (not shown in FIG. 2), which receives the TV reflected sound, the noises, and the user's voice and converts them into frequency signals. The voice recognition system 20 includes a reflected sound remover 21, which receives the frequency signals from the microphone and outputs only vocal signals corresponding to the user's voice. It is relatively easy for a minute noise to be recognized whereas it is very difficult for the reflected sound to be recognized. Therefore, as shown in FIG. 3, the present invention includes a first, a second and a third infinite-impulse response filter banks (IIR filter bank) 211, 212, 213 respectively in order to efficiently separate and remove said reflected sound.

The first filter bank 211 includes an M number of channel filters ($H_0, H_1, H_2, \ldots H_{M-1}$) to divide audio signals decoded from broadcast signals into different frequency ranges (sub bands). The second filter bank 212 also includes an M number of the channel filters ($H_0, H_1, H_2, \ldots H_{M-1}$) to divide the audio signals converted from the TV reflected sound, the noises, and the user's voice into the different frequency ranges (sub bands). Each channel of the $H_0, H_1, H_2, \ldots H_{M-1}$ passes the signals according to the frequency ranges.

The reflected sound remover 21 further includes an adaptive filter unit 215 containing filters ($W_0, W_1, W_2, \ldots W_{M-1}$), which receives the divided signals from the first filter bank 211 and the second filter bank 212. Each of the $W_0, W_1, W_2, \ldots W_{M-1}$ receives respectively the signals at the same frequency range from the first filter bank 211 and the second filter bank 212. For example, the filter $W_0$ receives the signal from the channel filter ($H_0$) of the first filter bank 211 and the signal from the channel filter ($H_0$) of the second filter bank 212. The adaptive filters ($W_0, W_1, W_2, \ldots W_{M-1}$) compare the two outputted signals from the first filter bank 211 and the second filter bank 212 and determine if the frequencies and amplitudes of the two signals are identical or similar. The adaptive filters ($W_0, W_1, W_2, \ldots W_{M-1}$) detect the signal from the second filter band 212 to be nearly identical to the signal from the first filter bank 211. If the signal from the second filter bank 212 is nearly identical to the signal from the first filter bank 211, the signals are considered to be the TV reflected sound signals. Then the adaptive filters ($W_0, W_1, W_2, \ldots W_{M-1}$) removed the signal from the signals from the first filter bank 212. As a result, the adaptive filter unit 215 outputs the divided signals except for the reflected TV sound signals. The third filter bank 213 receives and combines the divided signals from the adaptive filter unit 215. The combined signals include the user's voice and may include the noises and the residual reflected sound signals. Therefore, the present invention may include a noise remover (not illustrated), which filters the signals from the third filter bank 213 based on a threshold value.

The voice recognition system 20 further includes a voice detector 22, which receives the signals from the reflected sound remover 21 and detects the user's voice from the received signals. The voice detector 22 obtains a user's voice information based on the user's voice. For example, to determine an interval of the user's voice, the voice detector 22 detects a beginning and an end of the voice and detects the frequency range, amplitude, and a wave shape of the user's voice. Now, the voice detector 22 sends the user's voice information to the reflected sound remover 21 and a voice recognition unit 23.

The voice recognition system 20 also includes a memory 24, which stores voice patterns, probability models having statistical data of the voice patterns. When the user's voice is detected in the voice detector 22, the voice recognition unit 23 compares the user's voice with the stored voice patterns in the memory 24. It then determines a probability (similarity level) of each stored voice matching the user's voice. Based on the probability, it determines if the user's voice is a certain voice pattern that corresponds to the stored voice in the memory 24 and what voice pattern it is. A controller 11 in the TV 10 manipulates the TV 10 as the user's voice desires.

Figure 4:
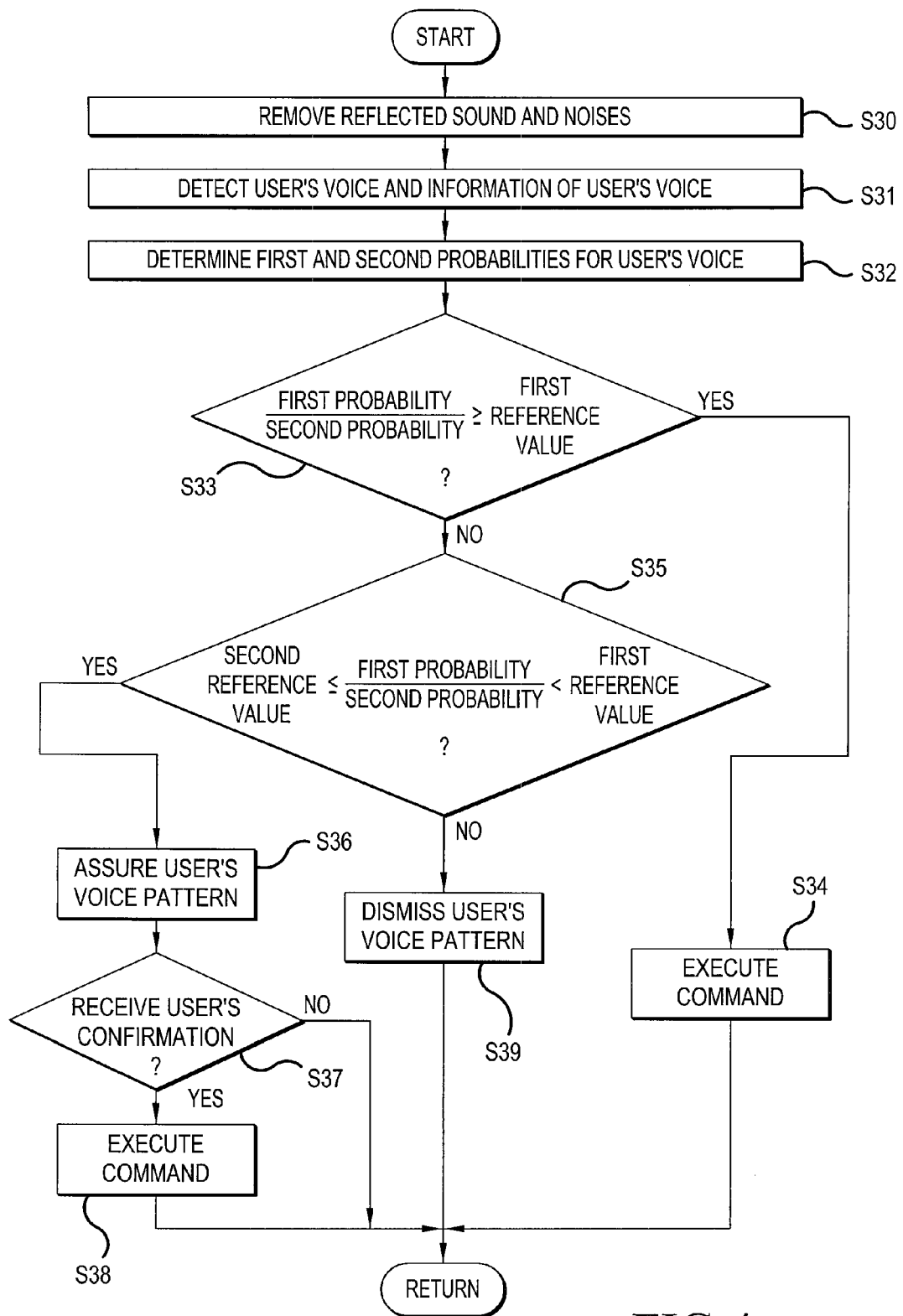
FIG. 4 is a flowchart illustrating the voice recognition system in the AV system in accordance with the present invention.

FIG. 4 is a flowchart illustrating a voice recognition system in AV system. When the user says a user's voice such as "volume down", the user's voice is received by the microphone and transmitted to the reflected sound remover 21. However, the reflected TV sound and the noises are transmitted to the reflected sound remover 21 along with the user's voice.

The transmitted user's voice, TV reflected sound, and noises are divided into the different frequency ranges and the divided reflected TV sound is removed by the adaptive filters ($W_0, W_1, W_2, \ldots W_{M-1}$) and the noises is removed by the noise remover (S30). The reflected sound remover (21)

removes the reflected TV sound by using the IIR filter banks 211, 212, 213 according to sub bands filtering method.

Figure 5:
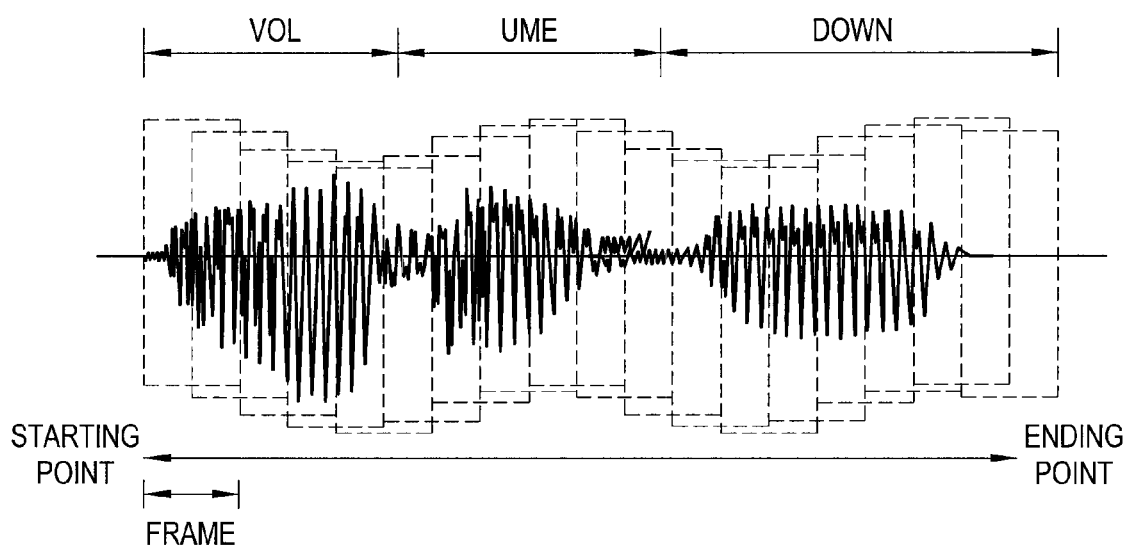
FIG. 5 is an example illustrating a user's decoded audio signal by the voice recognition system in accordance with the present invention.

The voice detector 22 receives all the signals but the removed reflected sound and the noises from the reflected sound remover 21. As show in FIG. 5, the sinusoidal waves of the signals are analyzed into frames in order to detect the user's voice (S31). The voice detector 22 also figures the starting and ending points of the signals and determines the frequency range and the amplitudes, and so on. The voice detector 22 compares energy (i.e. amplitude) of the user's voice with a predetermined reference value. For example, a point, where the energy of the signal inputted to the voice detector 22 is greater than a first threshold value, is the starting point, and another point, where the energy of the signal inputted to the voice detector 22 is greater than a second threshold value, is the ending point.

When the starting point of the user's voice is determined, the adaptive filter unit 215 stops adapting. But it restarts adapting when the ending point of the user's voice is determined. Adjusting is immediately predicting a route of the TV sound when reflected, altering filtering parameters such as blocking frequencies or passing frequencies of the adaptive filters ($W_0, W_1, W_2, \ldots W_{M-1}$) according to the reflected sound route being changed. An example of the reflected sound route is change according to the user's moving.

However, the filtering parameters of the adaptive filters ($W_0, W_1, W_2, \ldots W_{M-1}$) should be fixed when the reflected sound remover 21 receives both the reflected sound and the user's voice together because it is difficult to know the precise filtering parameters. The filtering parameters of the adaptive filters ($W_0, W_1, W_2, \ldots W_{M-1}$) can be changed according to the reflected sound route only when the reflected sound itself is received.

The voice recognition unit 23 determines a first probability of the user's voice matching at least one of the stored voice patterns corresponding to predetermined words. It also determines a second probability of not matching one of voice patterns corresponding to words which are not predetermined (S32). To determine the first probability, the user's voice is first compared with each of the voice patterns stored in a first model such as "change channel", "volume up", and "volume down". The probabilities (i.e. similarities) of the stored voice patterns matching the user's voice are calculated. The first model is specifically a hidden markov model (HMM) which includes the voice patterns corresponding to the predetermined words. The voice recognition unit 23 determines considers the highest probability among the calculated probabilities as the first probability. To determine the second probability, the voice recognition unit 23 uses a second model, particularly a filler model accumulating the voice patterns corresponding to the words which are not predetermined. The user's voice is compared with each of the voice patterns stored in the second model and the probabilities of the stored voice patterns in the second model matching the user's voice are calculated. The voice recognition unit 23 considers the highest probability among the calculated probabilities as the second probability. It then determines the ratio of the first and the second probabilities (the former/the latter) and compares the ratio with a first reference value and a second reference value (S33, S35). As a note, the first reference value is used for malfunction percent of 0.5% and the second reference value is used for malfunction percent of 5%. The first and the second reference values are obtained from the experiments.

If the ratio of the first and the second probabilities is greater than or equal to the first reference value, the voice recognition unit 23 recognizes the transmitted user's voice. For example, the voice recognition unit 23 assures the voice pattern that corresponds to the first probability from the first model and sends an instruction corresponding to the voice pattern to the controller 11. The controller 11 now manipulates the TV 10 based on the user's voice pattern.

If the ratio of the first and the second probabilities is less than the first reference value and greater than the second reference value, the voice recognition unit 23 does not automatically recognize the transmitted user's voice but displays a word that best corresponds to the user's voice. For example, the voice recognition unit 23 requests the controller 11 that it assures the voice pattern that corresponds to the first probability from the first model (S36). The controller 11 then displays the assured voice pattern (i.e. volume down) and waits to receive the user's confirmation. If the user says, "yes", "OK", or "select" as a confirmation (S37), the controller 11 volumes down the TV 10 (S38). If the user refuses the confirmation by saying "No" or "cancel", the controller 11 deletes the display voice pattern, "volume down" on the TV 10.

If the ratio of the first and the second probabilities is less than the second reference value, the voice recognition unit 23 does neither attempt to recognize the user's voice nor sends any signal to the controller 11 (S39). Therefore, the controller 11 does not respond to the user's voice.

The present invention makes it possible that the voice recognition system functions precisely even with the reflected sound and the noises because it detects the user's voice based on the ratio of the two probabilities of the user's voice being matched and not matched one of the stored voice patterns. The present invention is also applicable to not only the electronic home appliances but also translating devices, handsets, toys, and the like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A voice recognition system for an audio-visual (AV) system generating an audio, the voice recognition system comprising:
    a reflected sound remover having a plurality of filters, the reflected sound remover being configured to receive an input sound signal including a reflected AV system audio, a user's voice, and a noise, and being configured to remove the reflected audio from the input sound according to user's voice information;
    a voice detector configured to detect the user's voice from a signal outputted from the reflected sound remover and to obtain the user's voice information based on the detected user's voice; and
    a voice recognition unit configured to compare the detected user's voice with voice patterns that belong to at least one model, wherein the reflected sound remover comprises:
    a first filter bank dividing the original AV system audio into a first plurality of signals having different frequency ranges;
    a second filter bank dividing the input sound into a second plurality of signals having the different frequency ranges;
    a plurality of adaptive filters removing the reflected AV system audio from the second plurality of signals using the first plurality of signals;

a third filter bank combining the signals outputted from the plurality of adaptive filters;

wherein the plurality of adaptive filters are configured to determine whether or not to adapt according to the voice detector detecting a beginning and an end of the user's voice; and wherein when the starting point of the user's voice is determined, the adaptive filter unit stops adapting, but it restarts adapting when the ending point of the user's voice is determined.

2. The voice recognition system of claim 1, further comprising a noise remover configured to remove the noise and an unremoved portion of the reflected AV system audio signal from the audio signal outputted from the reflected sound remover.

3. The voice recognition system of claim 1, wherein the reflected sound remover is further configured to adjust at least one of a cut-off frequency, a passing frequency, and a reflected audio signal removing rate of the filters according to the user's voice information.

4. The voice recognition system of claim 1, wherein the user's voice information includes a starting timing and an ending timing of the user's voice.

5. The voice recognition system of claim 4, wherein the user's voice information further includes a frequency range, amplitudes, and a wave shape of the user's voice.

6. The voice recognition system of claim 1, wherein the voice recognition unit is further configured to calculate a first probability that the user's voice matches at least one of the voice patterns that belong to a first model, and a second probability that the user's voice matches one of the voice patterns that belong to a second model.

7. The voice recognition system of claim 6, wherein the voice recognition unit is further configured to determine whether or not to recognize the user's voice according to a ratio of the first probability to the second probability.

8. The voice recognition system of claim 6, wherein the voice signal patterns that belong to the first model are predetermined.

9. The voice recognition system of claim 6, wherein the voice signal patterns that belong to the second model are accumulated and not predetermined.

10. The voice recognition system of claim 6, wherein the voice recognition unit is further configured to compare a ratio of the first probability and the second probability with reference values, and to recognize the user's voice based on an outcome of the comparison.

11. The voice recognition system of claim 6, wherein the voice recognition unit is further configured to calculate a plurality of probabilities that the user's voice matches the voice patterns in the first model, and to select a highest probability from the plurality of probabilities as the first probability.

12. The voice recognition system of claim 6, wherein the voice recognition unit is further configured to calculate a plurality of probabilities that the user's voice matches the voice patterns in the second model, and to select a highest probability from the plurality of probabilities as the second probability.

13. A method for recognizing a voice for an audio-visual (AV) system generating an audio, the method comprising:
receiving an input signal including a reflected AV system audio, a user's voice, and a noise;
dividing an original; AV system audio signal into a first plurality of signals having different frequency ranges by a first filter bank;

dividing the input sound into a second plurality of signals having the different frequency ranges by a second filter bank;

removing the reflected AV system audio signal from the second plurality of signals using the first plurality of signals by a plurality of adaptive filters;

combining the signals outputted from the plurality of adaptive filters by a third filter bank;

detecting the user's voice from the first signal and obtaining the user's voice information based on the detected user's voice; comparing the detected user's voice with voice patterns that belong to at least one model;

wherein the removing the reflected AV system audio signal comprises determining whether or not to adapt the plurality of adaptive filters according to a beginning and an end of the user's voice detected; and wherein when the starting point of the user's voice is determined, the adaptive filter unit stops adapting, but it restarts adapting when the ending point of the user's voice is determined.

14. The method of claim 13, wherein the removing the reflected AV system audio includes fixing parameters of the plurality of filters during an interval from a starting timing to an ending timing of the user's voice.

15. The method of claim 14, wherein the parameters include at least one of a cut-off frequency, a passing frequency, and a reflected audio removing rate of the plurality of filters.

16. The method of claim 13, further comprises removing the noise and an unremoved portion of the reflected AV system audio signal from the signal passed through a plurality of filters.

17. The method of claim 13, wherein the removing the reflected AV system audio comprises controlling at least one of a cut-off frequency, a passing frequency, and a reflected audio signal removing rate of the plurality of filters based on the user's voice information.

18. The method of claim 13, wherein the comparing the detected user's voice signal with voice signal patterns from at least one model comprises calculating a first probability that the user's voice matches the voice patterns in a first model, and calculating a second probability that the user's voice matches the voice patterns in a second model.

19. The method of claim 18, further comprises determining a ratio of the first probability and the second probability.

20. The method of claim 19, further comprises comparing the determined ratio with reference values, and recognizing a user's voice based on the comparing result.

21. The method of claim 18, wherein the first model includes voice patterns which correspond to predetermined words.

22. The method of claim 18, wherein the second model accumulates voice patterns which do not correspond to the predetermined words.

23. The method of claim 18, further comprising recognizing the user's voice if a ratio of the first probability and the second probability is equal to or greater than the first reference value.

24. The method of claim 18, further comprising displaying a word that corresponds to the user's voice if a ratio of the first probability and the second probability is less than the first reference value or greater than the second reference value.

* * * * *